United States Patent
Cambou

(10) Patent No.: US 10,140,220 B2
(45) Date of Patent: Nov. 27, 2018

(54) METHOD OF PERFORMING AUTHENTICATION WITH A MEMORY CIRCUIT USING DYNAMIC RANDOM ACCESS MEMORY ARRAYS

(71) Applicant: Bertrand F. Cambou, Flagstaff, AZ (US)

(72) Inventor: Bertrand F. Cambou, Flagstaff, AZ (US)

(*) Notice: Subject to any disclaimer, the term of this patent is extended or adjusted under 35 U.S.C. 154(b) by 0 days.

(21) Appl. No.: 15/797,175

(22) Filed: Oct. 30, 2017

(65) Prior Publication Data

US 2018/0052782 A1 Feb. 22, 2018

Related U.S. Application Data

(63) Continuation of application No. 14/958,375, filed on Dec. 3, 2015, now Pat. No. 9,804,974.

(60) Provisional application No. 62/159,464, filed on May 11, 2015.

(51) Int. Cl.
| | |
|---|---|
| *G06F 21/00* | (2013.01) |
| *G06F 12/14* | (2006.01) |
| *G06F 3/06* | (2006.01) |
| *H04L 9/32* | (2006.01) |
| *G11C 15/04* | (2006.01) |
| *G06F 21/79* | (2013.01) |
| *H04L 9/08* | (2006.01) |
| *G11C 11/4076* | (2006.01) |
| *G11C 11/4078* | (2006.01) |

(52) U.S. Cl.
CPC ........ *G06F 12/1408* (2013.01); *G06F 3/0622* (2013.01); *G06F 3/0653* (2013.01); *G06F 3/0683* (2013.01); *G06F 21/00* (2013.01); *G06F 21/79* (2013.01); *G11C 15/043* (2013.01); *H04L 9/0894* (2013.01); *H04L 9/3226* (2013.01); *G06F 2212/1016* (2013.01); *G11C 11/4076* (2013.01); *G11C 11/4078* (2013.01); *Y02D 10/13* (2018.01)

(58) Field of Classification Search
CPC .... G06F 12/14; G06F 12/1408; G06F 3/0622; G06F 3/0653; G06F 3/0683; G06F 21/00; G06F 17/30982; G06F 21/79; G06F 2212/1016; G11C 15/043; G11C 11/4078; G11C 11/4076; H04L 9/0894; H04L 9/3226; Y02D 10/13

See application file for complete search history.

(56) References Cited

U.S. PATENT DOCUMENTS

| | | | |
|---|---|---|---|
| 2002/0133668 A1* | 9/2002 | Sherman | H04L 45/7453 711/108 |
| 2012/0060039 A1* | 3/2012 | Leclercq | G06F 21/10 713/189 |

(Continued)

*Primary Examiner* — Fatoumata Traore
*Assistant Examiner* — Amie C. Lin
(74) *Attorney, Agent, or Firm* — Barclay Damon LLP

(57) ABSTRACT

A memory circuit using dynamic random access memory (DRAM) arrays. The DRAM arrays can be configured as CAMs or RAMs on the same die, with the control circuitry for performing comparisons located outside of the DRAM arrays. In addition, DRAM arrays can be configured for secure authentication where, after the first authentication performed with a non-volatile secure element, subsequent authentications can be performed by the DRAM array.

10 Claims, 11 Drawing Sheets

(56) References Cited

U.S. PATENT DOCUMENTS

| | | | |
|---|---|---|---|
| 2014/0033305 A1* | 1/2014 | Nelson | G06F 21/575 726/22 |
| 2014/0207897 A1* | 7/2014 | Kodama | H04L 45/745 709/213 |

* cited by examiner

| BCAM | Matching? | |
|---|---|---|
| Input \ Stored | "0" | "1" |
| "0" | Yes | No |
| "1" | No | Yes |

FIG. 1A
(Prior Art)

| TCAM | Matching? | | |
|---|---|---|---|
| Input \ Stored | "0" | "1" | "BX" |
| "0" (0,1) | Yes | No | Yes |
| "1" (1,0) | No | Yes | Yes |
| "BX" (1,1) | Yes | Yes | Yes |

FIG. 1B
(Prior Art)

METHOD OF PERFORMING AUTHENTICATION WITH A MEMORY CIRCUIT USING DYNAMIC RANDOM ACCESS MEMORY ARRAYS

CROSS-REFERENCE TO RELATED APPLICATIONS

This application is a continuation application of and claims the benefit and priority of, U.S. patent application Ser. No. 14/958,375, filed on Dec. 3, 2015, which is a non-provisional application of U.S. Provisional Patent Application Ser. No. 62/159,464, filed May 11, 2015. The entire contents of such applications are incorporated herein by reference.

BACKGROUND OF THE INVENTION

The subject matter disclosed herein relates to memory, and more particularly to the use of a memory circuit using Dynamic Random Access Memory arrays.

Many different types of memory circuits can be used to compare input data (e.g., an input pattern or search data) against stored data (e.g., reference pattern(s) or a table of stored data). One example of such a memory circuit is a Content Addressable Memory (CAM). When a CAM determines a match between the input data and the stored data, it returns the address(es) of the matching data.

A two-state CAM (or Binary CAM (BCAM)) uses binary data consisting entirely of two states (0s and 1s) for comparing input data to stored data as shown in the exemplary two-state CAM truth table of FIG. 1A. The two-state CAM truth table (FIG. 1A) is of an XOR gate (Exclusive OR), wherein the output is "yes" for a match only if both the input state and the stored state are the same. Conversely, the output is a "no" for a mismatch if the input state does not match the stored state.

A three-state CAM (or Ternary CAM (TCAM)) uses data consisting of 0s and 1s as well as a third state known as a "no care" state (or "BX" state) as shown in the exemplary three-state truth table of FIG. 1B. The TCAM truth table (FIG. 1B) is also of an XOR gate (Exclusive OR), wherein the output is "yes" for a match only if (a) the input state and the stored state are the same, (b) the stored state is a "no care" state (BX) regardless of the input state (0, 1, or BX), or (c) the input state is a "no care" state (BX) regardless of the stored state (0, 1, or BX). Conversely, the output is a "no" for a mismatch if the input state does not match the stored state, except in the case where the input state or the stored state is a "no care" state (BX). In many cases, the input data is a stream of several bits, where each input bit must be compared to a stored bit in a CAM cell to determine if all of the bits match to provide a "yes" output.

Most conventional CAMs are built with static random access memory (SRAM) cells or Flash Negative-AND (NAND) cells, where a typical two-state CAM consists of two cells/bit and a typical three-state CAM consists of four cells/bit. Given the high speed of the cells, conventional CAMs allow for stored of information that can be retrieved rapidly. However, SRAMs and Flash cells operate at high power and can be expensive to produce. In addition, conventional CAM arrays for handling multiple bits are manufactured with the control circuitry (e.g., comparators) for comparing the input data and the stored data within the array, increasing the complexity and cost of the memory circuits, while restricting the flexibility of the CAM arrays.

BCAMs and TCAMs designed with three-dimensional (3D) packaging where multiple die are stacked together have been disclosed in, e.g., U.S. Pat. Nos. 8,513,791 and 8,576,599. This can improve system performance and reduce power consumption. In these designs, the vertical connections at the cell level reduce the resistivity between the CAM cell and the circuitry located in a different die. However, since one connection of 3D connections per cell is then required, or millions per die, this is difficult to manufacture.

Dynamic Random Access Memory (DRAM) is another type of memory that stores each bit of data in a separate capacitor where each memory point consists of a single capacitor and a single transistor per bit. DRAM is often used in personal computers as the main memory, e.g., in desktops, laptops, video game consoles, etc. The capacitor can be either charged ("1") or discharged ("0") with these two states representing the two values of a bit. Since the capacitors will always discharge, the capacitors are typically "dynamically" refreshed every millisecond. During the read cycles, typically done within 2 ns to 15 ns, the sensing elements of the DRAMs compare the voltage across each cell with the one stored in a reference cell to determine if a "1" or a "0" state has been programmed. Since DRAMs consist of volatile memory, it loses its data when power is removed and is therefore not suitable for secure elements, which store reference patterns (e.g, words or keys) in non-volatile memory (e.g., Flash or EEPROM).

As disclosed in, e.g., U.S. Pat. Nos. 6,331,961, 6,430,073, 7,016,211, 7,088,603, 7,307,860, 7,508,022, and 8,089,793, DRAM has been used in the design of CAMs or TCAMs, replacing conventional SRAMs with DRAMs. Since DRAM only requires only one capacitor and one transistor per bit, is less expensive than SRAM, BCAMs and TCAMs made with DRAM (i.e., DCAMs) are less expensive than conventional BCAMs and TCAMs made with SRAM. However, since DRAMs are typically slower than SRAMs, operate slower than conventional BCAMs and TCAMs made with SRAM.

The technologies and processes used to manufacture DRAM s are extremely complicated, expensive, and time consuming. Since DRAM cells are densely packed within bi-dimensional arrays, it is important to keep the packing density constant. Existing techniques for designing DCAMs include breaking the periodicity of the DRAM arrays, mixing DRAM cells with comparing circuitry since a comparator is employed in each cell to compare the bit of the input pattern with the corresponding bit of the reference pattern. As a result, these DRAM cells used in DCAMs are not packed the same way as traditional DRAM arrays, and cannot be produced without re-developing the DRAM manufacturing technology.

The discussion above is merely provided for general background information and is not intended to be used as an aid in determining the scope of the claimed subject matter.

BRIEF DESCRIPTION OF THE INVENTION

A memory circuit using dynamic random access memory (DRAM) arrays is disclosed. The DRAM arrays can be configured as CAMs or RAMs on the same die, with the control circuitry for performing comparisons located outside of the DRAM arrays. In addition, DRAM arrays can be configured for secure authentication where, after the first authentication performed with a non-volatile secure element, subsequent authentications can be performed by the DRAM array. Input patterns can be loaded into a DRAM array by loading logic state ones ("1") into each of the plurality of input data bit lines in each of the columns in the DRAM array and shunting one or more of the plurality of input data bit lines in the DRAM array corresponding to logic state zeroes ("0") in the input pattern.

In one embodiment, a memory circuit is disclosed. The memory circuit comprises a first dynamic random access memory (DRAM) array configured as a content addressable memory (CAM) located on the first die, wherein the CAM comprises a first block of a plurality of DRAM cells configured for storing a first reference pattern and a second block of a plurality of DRAM cells configured for receiving a first input pattern, and a second DRAM array configured as a random access memory (RAM) located on the first die, wherein the RAM comprises a third block of a plurality of DRAM cells configured for storing a second reference pattern. The memory circuit can also include a compare circuit for comparing the first plurality of DRAM cells configured for storing the first reference pattern to the second plurality of DRAM cells for receiving the first input pattern, wherein the compare circuit is located outside of the first DRAM array and the second DRAM array.

In another embodiment, a method of performing authentication with a memory circuit is disclosed. The method comprises the steps of performing a first authentication with a non-volatile secure element, comparing a first user-provided key with a key stored in the secure element, downloading the first user-provided key to a dynamic random access memory (DRAM) array configured as a content addressable memory (CAM), and performing a second authentication with the DRAM array, comparing a second user-provided key with the first user-provided key stored in the DRAM array.

In yet another embodiment, a method of downloading an input pattern to a dynamic random access memory (DRAM) array configured as a content addressable memory (CAM) is disclosed. The array includes a plurality of columns formed by a plurality of input data bit lines. The method comprises loading logic state ones ("1") into each of the plurality of input data bit lines in each of the columns in the DRAM array, and shunting one or more of the plurality of input data bit lines in the DRAM array corresponding to logic state zeroes ("0") in the input pattern.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which:

FIGS. 1A and 1B are illustrations of exemplary truth tables for two-state CAMs (BCAMs) and three-state CAMs (TCAMS);

DETAILED DESCRIPTION OF THE INVENTION

Figure 2:
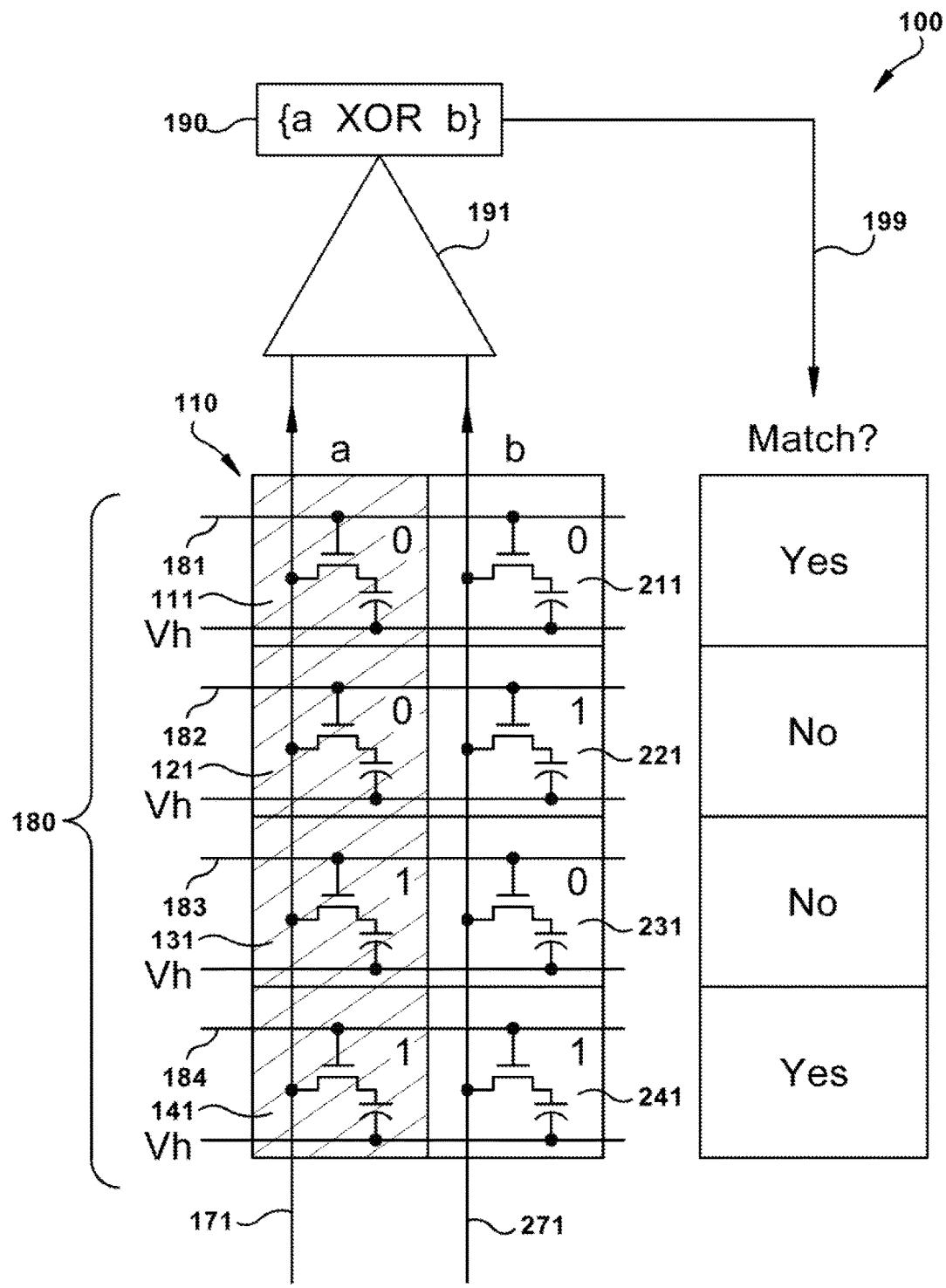
FIG. 2 is a diagram of an exemplary two-state CAM (DBCAM) implemented with a DRAM array.

FIG. 2 is a diagram of a DRAM array 110 configured as an exemplary two-state CAM (DBCAM) 100. As shown in FIG. 2, the exemplary two-state CAM 100 includes a DRAM array 110 and compare circuitry 190. The DRAM array 110 of the two-state CAM 100 comprises a first block of a plurality of stored data DRAM cells 111, 121, 131, 141 for storing one or more reference patterns (e.g, words or keys) and a second block of a plurality of input data DRAM cells 211, 221, 231, 241 for receiving an input pattern (of the same size as the reference patterns) downloaded via the input data bit line 271. Accordingly, the reference patterns are stored in one half of the DRAM array 110 (stored data DRAM cells 111, 121, 131, 141) while the input pattern is received multiple times in the other half of the DRAM array 110 (input data DRAM cells 211, 221, 231, 241). As shown in FIG. 2, the DRAM cells can be in a discharged state ("0") or a charged state ("1"). While the exemplary two-state CAM (DBCAM) 100 of FIG. 2 shows a single bit reference pattern and four rows for illustrative purposes, it will be understood that that reference pattern can be several thousands of bits long and that there can be hundreds of rows. Typical bit lengths are 64 or 128 bits to store and route IP addresses. In chip security applications, the length could be in the range of 1,000 bits or more to run complex RSA algorithms. The height or number of words can also be very large for high capacity CAMs. It will be understood that the term DRAM arrays as used herein comprises DRAM cells that are not necessarily configured as a RAM, but can be configured as a CAM.

In the exemplary two-state CAM 100 of FIG. 2, there are two DRAM cells per single bit, with one cell 111, 121, 131, 141 for storing the reference pattern and a second cell 211, 221, 231, 241 for receiving the input pattern. For example, a 1 Mbit DBCAM die needs one 1 Mbit DRAM array to store the reference patterns and one 1 Mbit DRAM array to receive the input pattern for a total of 2 Mbit DRAM cells.

A plurality of pattern (or word) select lines 180 can be used to select a particular reference pattern to be compared to an input pattern during an authentication cycle. For example (1) a first pattern select line 181 for the first row is activated to compare the stored data in the stored data DRAM cell 111 for the first pattern to the input data in the input data DRAM cell 211 for the first pattern, (2) a second pattern select line 182 for the second row is activated to compare the stored data in the stored data DRAM cell 121 for the second pattern to the input data in the input data DRAM cell 221 for the second pattern, (3) a third pattern select line 182 for the third row is activated to compare the stored data in the stored data DRAM cell 131 for the third pattern to the input data in the input data DRAM cell 231 for the third pattern, and (4) a fourth pattern select line 184 for the fourth row is activated to compare the stored data in the stored data DRAM cell 141 for the fourth pattern to the input data in the input data DRAM cell 241 for the fourth pattern. As shown in FIG. 2, when activated, the pattern select lines 180-184 activate a transistor in each cell in a particular row. Once a cell is activated, the bit lines 171, 271 can read the state of the DRAM cell as either in a discharged state ("0") or a charged state ("1"). In one embodiment to provide sufficient flexibility, the capacitor of the DRAM cell is connected between the transistor and a control voltage (Vh) to correctly charge the capacitor.

The matching operation works sequentially with one row tested during one authentication cycle at a time with the stored data bit line 171, and the input data bit line 271 activated concurrently. The compare circuitry 190 of the two-state CAM 100 can implement the BCAM truth table shown in FIG. 1A using an XOR gate (Exclusive OR), wherein the output 199 of the compare circuitry 190 is "yes" for a match only if both the input pattern on the input data bit line 271 and the stored reference pattern on the stored data bit line 171 are the same. Conversely, the output is a "no" for a mismatch if the input pattern on the input data bit line 271 does not match the stored reference pattern on the stored data bit line 171. In one embodiment, the compare circuitry 190 includes a comparator 191 to compare the input pattern on the input data bit line 271 to the stored reference pattern on the stored data bit line 171. This single comparator 191 can be used to compare the reference pattern and the input pattern in each row of the DRAM array 110.

As shown in FIG. 2, the exemplary two-state CAM 100 includes compare circuitry 190 that is located outside of the DRAM array 110. For example, the DRAM array 110 can be located on a first die and the compare circuitry 190 can be located on a second die, or the DRAM array 110 and the compare circuitry 190 can be located on the same die. Locating the compare circuitry 190 outside of the DRAM array 110 simplifies the manufacturing of the DRAM array 110 and allows greater flexibility in the configuration of the DRAM array 110 independent of the requirements of the compare circuitry 190. This separation of the DRAM array 110 from the required control circuitry 190 allows for a DRAM array on a single die to be divided into different sections (RAM, CAM, etc.) with uniform manufacturing of the DRAM array using existing manufacturing techniques and without the need to break the periodicity of the DRAM arrays.

Figure 3:
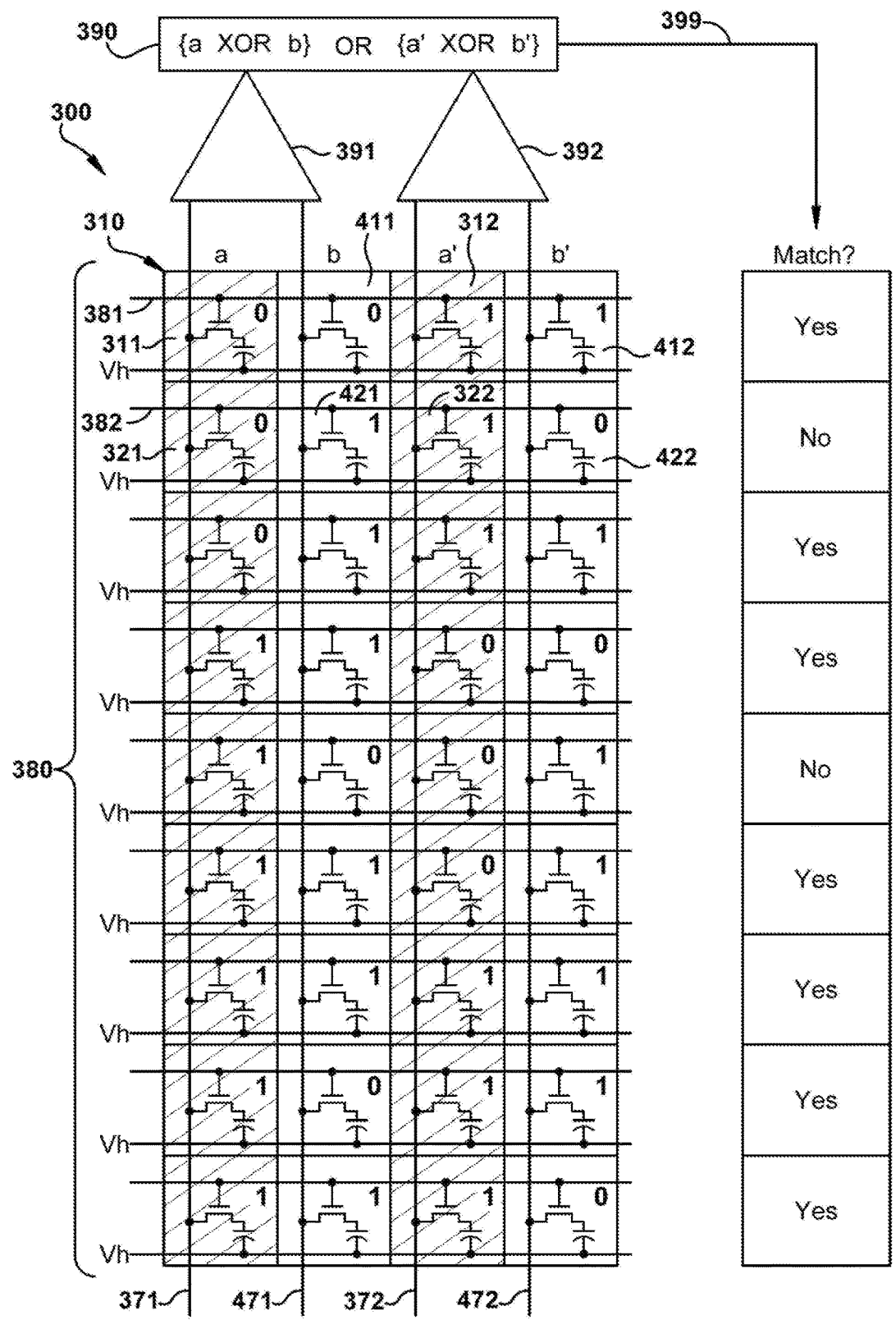
FIG. 3 is a diagram of an exemplary three-state CAM (DTCAM) implemented with a DRAM array.

FIG. 3 is a diagram of a DRAM array 310 configured as an exemplary three-state CAM (DTCAM). As shown in FIG. 3, the exemplary three-state CAM 300 includes a DRAM array 310 and compare circuitry 390. The DRAM array 310 of the three-state CAM 300 comprises a first block of a plurality of stored data DRAM cells (e.g., 311, 312, 321, 322) for storing one or more reference patterns (e.g, words or keys) and a second block of a plurality of input data DRAM cells (e.g., 411, 412, 421, 422) for receiving an input pattern (of the same size as the reference patterns) downloaded via the input data bit lines 471, 472. Accordingly, the reference patterns are stored in one half of the DRAM array 310 (stored data DRAM cells 311, 312, 321, 322) while the input pattern is received multiple times in the other half of the DRAM array 310 (input data DRAM cells 411, 412, 421, 422). As shown in FIG. 3, the DRAM cells can be in a discharged state ("0") or a charged state ("1"). While the exemplary three-state CAM (DTCAM) 300 of FIG. 3 shows a two bit reference pattern and nine rows for illustrative purposes, it will be understood that that reference pattern can be several thousands of bits long and that there can be hundreds of rows. Typical bit lengths are 64 or 128 bits to store and route IP addresses. In chip security applications, the length could be in the range of 1,000 bits or more to run complex RSA algorithms. The height or number of words can also be very large for high capacity CAMs.

In the exemplary three-state CAM 300 of FIG. 3, there are four DRAM cells in a row for the first two bit reference pattern with two cells 311, 312 for storing the reference pattern as a pair of bits (a, a') and another two cells 411, 412 for receiving the input pattern downloaded as a pair of bits (b, b'). Similarly, there are four DRAM cells in a row for the second two bit reference pattern, with two cells 321, 322 for storing the reference pattern as a pair of bits (a, a') and another two cells 421, 422 for receiving the input pattern downloaded as a pair of bits (b, b'). In one embodiment and a shown in the truth table of FIG. 1B, the three states are arbitrarily assigned as "0" (0,1), "1" (1,0), and "BX" (1,1) ("don't care"). For example, a 1 Mbit DTCAM die needs one 2 Mbit DRAM array to store the reference patterns and one 2 Mbit DRAM array to receive the input pattern for a total of 4 Mbit DRAM cells.

A plurality of pattern (or word) select lines 380 can be used to select a particular reference pattern to be compared an input pattern during an authentication cycle. For example (1) a first pattern select line 381 for the first row is activated to compare the stored data in the stored data DRAM cells 311, 312 for the first pattern to the input data in the input data DRAM cells 411, 412 for the first pattern, and (2) a second pattern select line 382 for the second row is activated to compare the stored data in the stored data DRAM cells 321, 322 for the second pattern to the input data in the input data DRAM cells 421, 422 for the second pattern. As shown in FIG. 3, when activated, the pattern select lines 380-382 activate a transistor in each cell in a particular row. Once a cell is activated, the bit lines 371, 372, 471, 472 can read the state of the DRAM cell as either in a discharged state ("0") or a charged state ("1"). In one embodiment to provide sufficient flexibility, the capacitor of the DRAM cell is connected between the transistor and a control voltage (Vh) to charge the capacitor.

The matching operation works sequentially with one row tested during one authentication cycle at a time with the stored data bit lines 371, 372 and the input data bit lines 471, 472 activated concurrently. The compare circuitry 390 of the three-state CAM 300 can implement the TCAM truth table shown in FIG. 1B using two XOR gates (Exclusive OR) ({a XOR b} OR {a' XOR b'}), wherein the output 399 of the compare circuitry 390 is "yes" for a match only if (a) the input pattern on the input data bit lines 371, 372 and the stored reference pattern on the stored data bit lines 471, 472 are the same, (b) the stored reference pattern is a "no care" state (BX) regardless of the input pattern (0, 1, or BX), or (c) the input pattern is a "no care" state (BX) regardless of the stored reference pattern (0, 1, or BX). Conversely, the output is a "no" for a mismatch if the input pattern does not match the stored reference pattern, except in the case where the input pattern or the stored reference pattern is a "no care" state (BX). In one embodiment, the compare circuitry 390 includes (1) a first comparator 391 to compare the first bit of the input pattern on the first input data bit line 471 and the first bit of the stored reference pattern on the first stored data bit line 371, and (2) a second comparator 392 to compare the second bit of the input pattern on the second input data bit line 472 and the second bit of the stored reference pattern on the second stored data bit line 372. These comparators 391, 392 can be used to compare the reference pattern and the input pattern in each row of the DRAM array 310.

As shown in FIG. 3, the exemplary three-state CAM 300 includes compare circuitry 390 that is located outside of the DRAM array 310. For example, the DRAM array 310 can be located on a first die and the compare circuitry 390 can be located on a second die, or the DRAM array 310 and the compare circuitry 390 can be located on the same die. Locating the compare circuitry 390 outside of the DRAM array 310 simplifies the manufacturing of the DRAM array 310 and allows greater flexibility in the configuration of the DRAM array 310 independent of the requirements of the compare circuitry 390. This separation of the DRAM array 310 from the required control circuitry 390 allows for a DRAM array on a single die to be divided into different sections (RAM, CAM, etc.) with uniform manufacturing of the DRAM array using existing manufacturing techniques and without the need to break the periodicity of the DRAM arrays.

Figure 4:
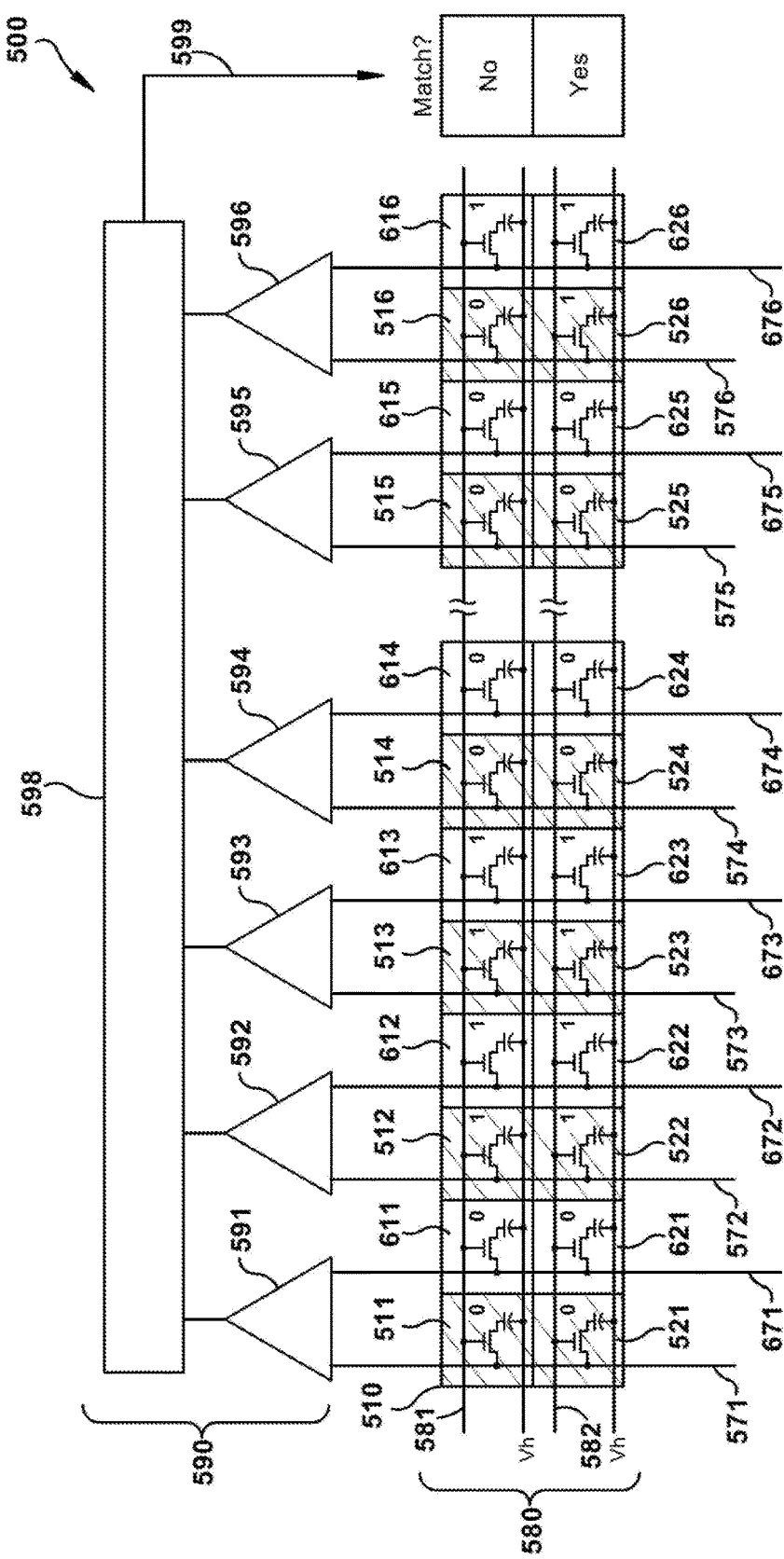
FIG. 4 is a diagram of another exemplary two-state CAM (DBCAM) implemented with a DRAM array.

FIG. 4 is a diagram of a DRAM array 510 configured as an exemplary two-state CAM (DBCAM) 500. As shown in FIG. 4, the exemplary two-state CAM 500 includes a DRAM array 510 and compare circuitry 590. The first row of the DRAM array 510 of the two-state CAM 500 comprises a first block of a plurality of stored data DRAM cells 511, 512, 513, 514, 515, 516 for storing a first reference pattern (e.g., a word or key) and a second block of plurality of input data DRAM cells 611, 612, 613, 614, 615, 616 for receiving an input pattern (of the same size as the reference patterns) downloaded via the input data bit lines 671, 672, 673, 674, 675, 676. Similarly, the second row of the DRAM array 510 of the two-state CAM 500 comprises a plurality of stored data DRAM cells 521, 522, 523, 524, 525, 526 for storing a second reference pattern (e.g, a word or key) and a plurality of input data DRAM cells 621, 622, 623, 624, 625, 626 for receiving the input pattern (of the same size as the reference patterns) downloaded via the input data bit lines 671, 672, 673, 674, 675, 676. Accordingly, the reference patterns are stored in one half of the DRAM array 510 (stored data DRAM cells 511, 512, 513, 514, 515, 516, 521, 522, 523, 524, 525, 526) while the input pattern is received multiple times in the other half of the DRAM array 510 (input data DRAM cells 611, 612, 613, 614, 615, 616, 621, 622, 623, 624, 625, 626). As shown in FIG. 4, the DRAM cells can be in a discharged state ("0") or a charged state ("1"). While the exemplary two-state CAM (DBCAM) 500 of FIG. 4 shows a six bit reference pattern and two rows for illustrative purposes, it will be understood that that reference pattern can be several thousands of bits long and that there can be hundreds of rows. Typical bit lengths are 64 or 128 bits to store and route IP addresses. In chip security applications, the length could be in the range of 1,000 bits or more to run complex RSA algorithms. The height or number of words can also be very large for high capacity CAMs.

A plurality of pattern (or word) select lines 580 can be used to select a particular reference pattern to be compared an input pattern during an authentication cycle. For example (1) a first pattern select line 581 for the first row is activated to compare the stored data in the stored data DRAM cells 511, 512, 513, 514, 515, 516 for the first pattern to the input data in the input data DRAM cells 611, 612, 613, 614, 615, 616 for the first pattern, and (2) a second pattern select line 582 for the second row is activated to compare the stored data in the stored data DRAM cells 521, 522, 523, 524, 525, 526 for the second pattern to the input data in the input data DRAM cells 621, 622, 623, 624, 625, 626 for the second pattern. As shown in FIG. 4, when activated, the pattern select lines 580-582 activate a transistor in each cell in a particular row. Once a cell is activated, the bit lines 571-576, 671-676 can read the state of the DRAM cell as either in a discharged state ("0") or a charged state ("1"). In one embodiment to provide sufficient flexibility, the capacitor of the DRAM cell is connected between the transistor and a control voltage (Vh) to charge the capacitor.

The matching operation works sequentially with one row tested during one authentication cycle at a time with the stored data bit lines 571, 572, 573, 574, 575, 576 and the input data bit lines 671, 672, 673, 674, 675, 676 activated concurrently. The compare circuitry 590 of the two-state CAM 500 can implement the BCAM truth table shown in FIG. 1A using an XOR gate (Exclusive OR) for each bit of the reference pattern. In one embodiment, the compare circuitry 590 includes a comparator 591, 592, 593, 594, 595, 596 for each bit of the reference pattern to compare a bit of the input pattern on an input data bit line 571, 572, 573, 574, 575, 576 to the corresponding bit of the stored reference pattern on a stored data bit line 671, 672, 673, 674, 675, 676. The compare circuitry 590 also includes a matching logic block 598 that outputs a "yes" on the output 599 of the compare circuitry 590 only if all of the comparators 591, 592, 593, 594, 595, 596 sense matches. These comparators 591, 592, 593, 594, 595, 596 can be used to compare the reference pattern and the input pattern in each row of the DRAM array 510.

As shown in FIG. 4, the exemplary two-state CAM 500 includes compare circuitry 590 that is located outside of the DRAM array 510. For example, the DRAM array 510 can be located on a first die and the compare circuitry 590 can be located on a second die, or the DRAM array 510 and the compare circuitry 590 can be located on the same die. Locating the compare circuitry 590 outside of the DRAM array 510 simplifies the manufacturing of the DRAM array 510 and allows greater flexibility in the configuration of the DRAM array 510 independent of the requirements of the compare circuitry 590. This separation of the DRAM array 510 from the required control circuitry 590 allows for a DRAM array on a single die to be divided into different sections (RAM, CAM, etc.) with uniform manufacturing of the DRAM array using existing manufacturing techniques and without the need to break the periodicity of the DRAM arrays.

As explained above, when the comparators of the compare circuitry compare the input pattern to the stored reference patterns, the comparison is between the electrical charge trapped in the input data DRAM cell (either high (a "1") or low (a "0"), to the electrical charge trapped on the stored data DRAM cell. The comparator sends a "yes" signaling a match if the electrical charges are similar and a "no" if the electrical charges are not. comparators sense the difference in voltage between two corresponding cells. The electric charges trapped in a DRAM cell are constantly drifting to a lower value due to leakages. Differential measurements are accurate as long as the charges are large enough. This is similar to a read cycle in a DRAM that is based on the comparison between a fixed reference, and the cell to be read. When the electrical charges trapped in each of the cells are below a critical value, a refresh cycle recharges each of the memory cells to their initial value. Since the typical period of time between two refresh cycles is in the range of 1 ms, this keeps the values of the electrical charges high enough to differentiate "1"s from "0"s, matches from mismatches. Since the exemplary method described here to build DCAMs uses traditional DRAM arrays, the DRAM circuitry to read and refresh the cells is also largely reused.

Figure 5:
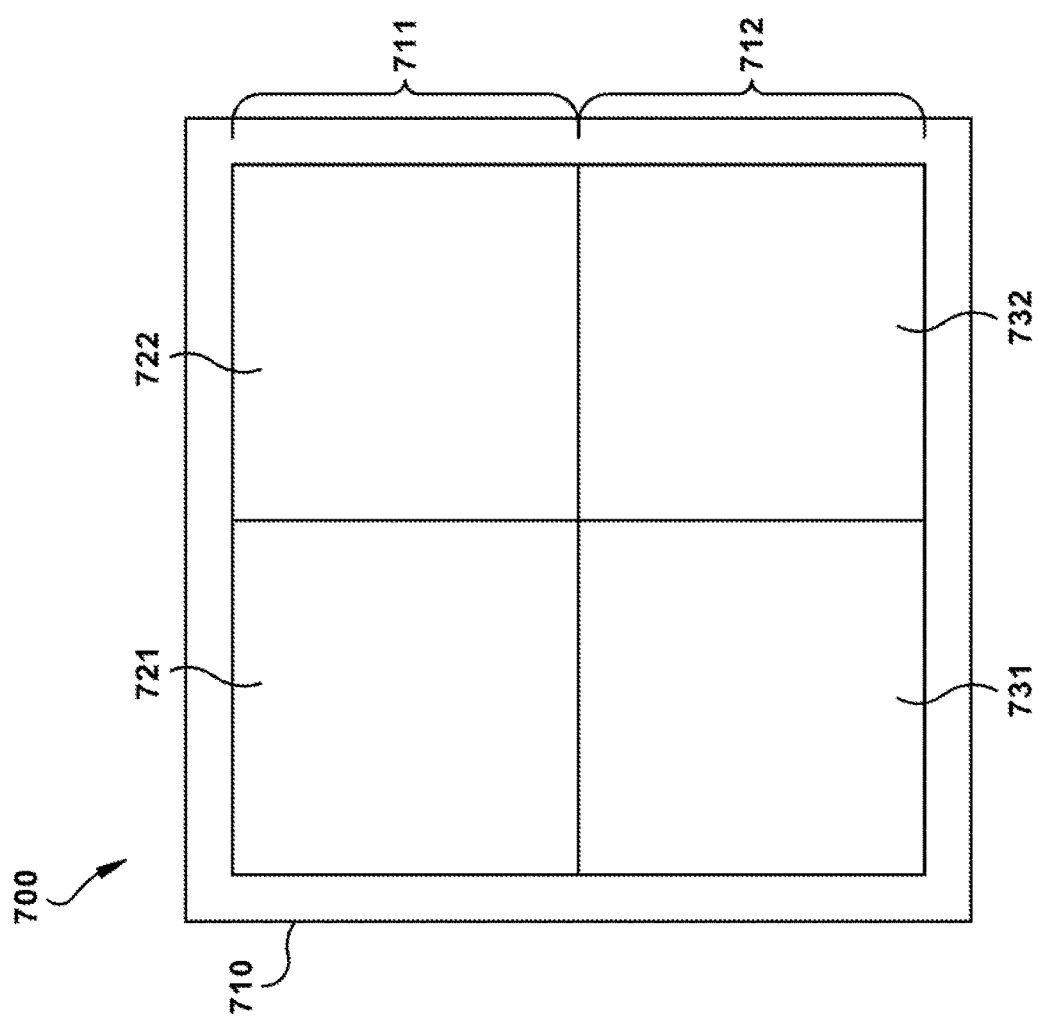
FIG. 5 is a diagram of an exemplary multi-architecture memory system containing DRAM arrays configured with different architectures on the same die.

As mentioned above, because the control circuitry for a CAM is located outside of the DRAM array, a single DRAM die can have portions of the chip designed as a CAM and portions designed as a conventional RAM, all using DRAM arrays. FIG. 5 illustrates an exemplary multi-architecture memory system 700 containing DRAM arrays 721, 722, 731, 732 configured with different architectures on the same die 710. The exemplary die 710 is divided into two sections: a first section 711 and a second section 712. The first section 711 of the die 710 includes a first DRAM RAM array 721 and a second DRAM RAM array 722, both configured as a RAM for use in conventional memory applications (e.g., routing). The second section 712 of the die 710 includes a first DRAM CAM array 731 and a second DRAM CAM array 732, both configured as a CAM, for use in security or authentication applications. Reference patterns can be stored in the DRAM RAM arrays 731, 732. Such reference patterns can include private cryptographic keys, symmetrical cryptographic keys, public keys for Public Key Infrastructure (PKI) implementation using algorithms such as Rivest-Shamir-Adleman cryptosystem (RSA), DSA, and Elliptic Curves (ECC). DRAM cells are suitable for such quick extraction since they are faster than FLASH and require low power. Secret reference patterns that are used for authentication can be stored on the same die in CAMs to be compared with input patterns without being extracted and without a read cycle, increasing the level of security. Such reference patterns can include pin codes and biometric authentication prints such as fingerprints and face recognition. Symmetrical reference patterns for algorithms such as Data Encryption Standard (DES), Advanced Encryption Standard (AES), and others can be stored in RAMs for computation or in CAMs for authentication. Although the exemplary embodiment illustrating the multi-architecture memory system 700 of FIG. 5 is shown using DRAM arrays, it will be understood that other memory types can also be used to create, e.g., CAMs and RAMs on the same die.

Figure 6:
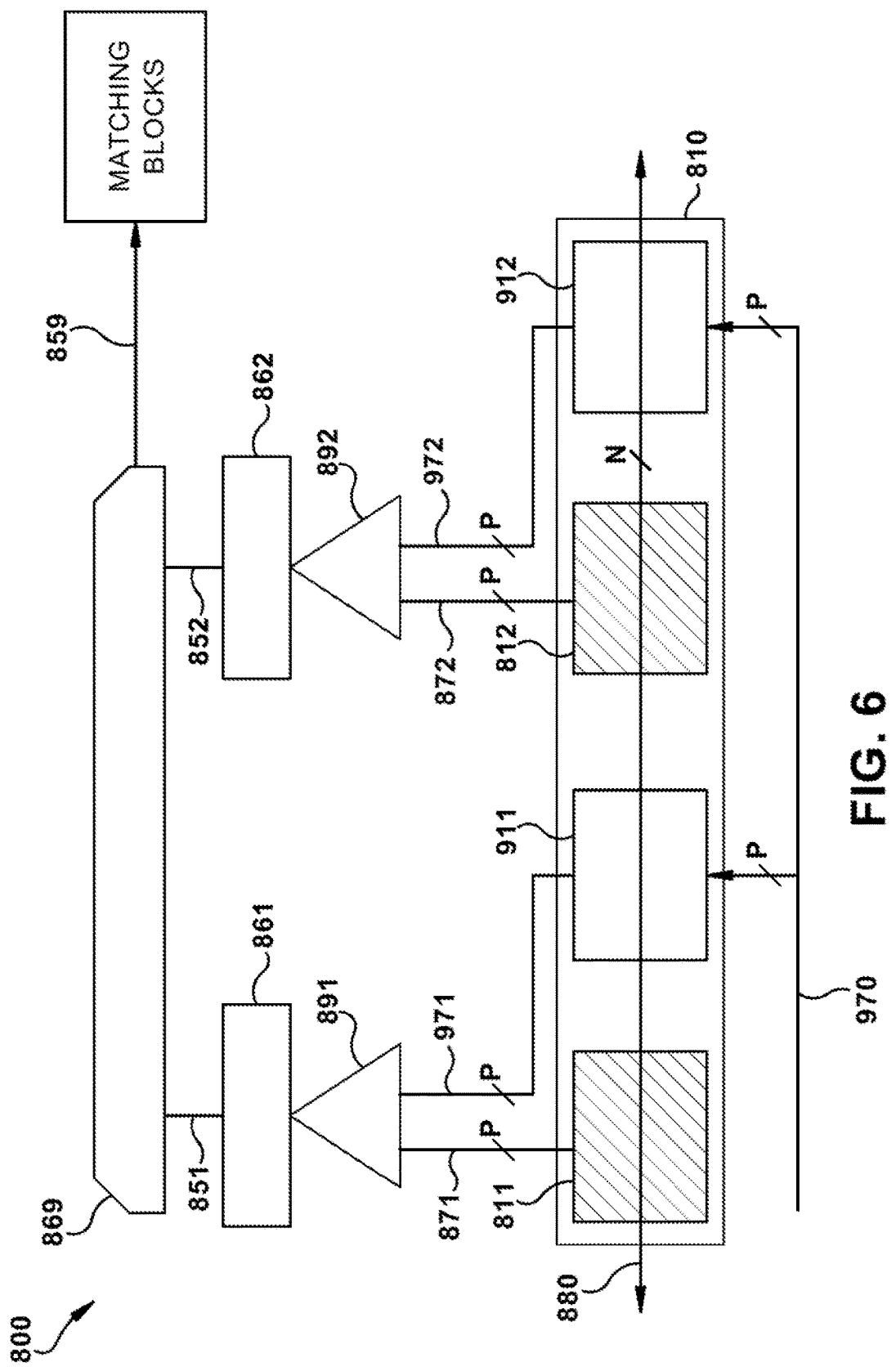
FIG. 6 is a diagram of an exemplary DCAM implemented with a DRAM array where two stored data blocks can be compared to an input pattern at the same time.

FIG. 6 is a diagram of an exemplary multi-block DCAM 800 implemented with a DRAM array 810 where two stored data blocks 811, 812 can be compared to an input pattern at the same time, increasing the speed of authentication. As shown in FIG. 6, the exemplary multi-block DCAM 800 includes a DRAM array 810 and compare circuitry 861, 862.

The DRAM array 810 comprises a first stored data block 811 for storing a first plurality of reference patterns (e.g., words or keys) and a second stored data block 812 for storing a second plurality of reference patterns. For example, each of the stored data blocks 811, 812 can comprise N rows (e.g., 16) for storing N reference patterns, and each of the reference patterns can be P bits long (or wide). The DRAM array 810 also comprises a first input data block 911 and a second input data block 912, both for receiving an input pattern (of the same size as the reference patterns) downloaded via the common input data lines 970. For example, each of the input data blocks 911, 912 can comprise N rows (e.g., 16) for receiving the same input pattern that can be P bits long (or wide) and provided by P common input data lines 970. Accordingly, the same input pattern is stored multiple times in the input data blocks 911, 912 for comparison with the reference patterns stored in the stored data blocks 811, 812. The reference patterns are stored in one half of the DRAM array 810 (stored data blocks 811, 812) while the input pattern is received multiple times in the other half of the DRAM array 810 (input data blocks 911, 912). While the exemplary DCAM 800 of FIG. 6 shows two stored data blocks 811, 812 and two input data blocks 911, 912 for illustrative purposes, it will be understood that a much larger array with more blocks can be employed.

A plurality of pattern (or word) select lines 880 can be used to select a particular reference pattern in a row of the stored data blocks 811, 812 to be compared the input pattern during an authentication cycle. As discussed previously, when activated, the pattern select lines 880 activate a transistor in each cell in a particular row. Once a row of P bits is activated in the stored data blocks 811, 812, the plurality of stored data bit lines 871, 872 can read the state of the DRAM cell as either in a discharged state ("0") or a charged state ("1"). Similarly, once a row of P bits is activated in the input data blocks 911, 912, the plurality of input data bit lines 971, 972 can read the state of the DRAM cell as either in a discharged state ("0") or a charged state ("1").

The matching operation works sequentially with one row of the stored data blocks 811, 812 compared to one row of the input data blocks 911, 912 during one authentication cycle at a time with the stored data bit lines 871, 872 and the input data bit lines 971, 972 activated concurrently so that multiple reference patterns (i.e., one from each of the stored data blocks 811,812) can be compared to the input pattern in the input data blocks 911, 912 at once. In one embodiment, the compare circuitry 861, 862 of the DCAM 800 can implement the BCAM truth table shown in FIG. 1A using an XOR gate (Exclusive OR) for each bit of the reference pattern. In one embodiment, the compare circuitry 861, 862 includes a first plurality of comparators 891 and a second plurality of comparators 892, one for each bit of the reference pattern to compare a bit of the input pattern on an input data bit line 971, 972 to the corresponding bit of the stored reference pattern on a stored data bit line 871, 872. The compare circuitry 861, 862 also includes a matching logic block that outputs a "yes" on the compare circuitry outputs 851, 852 of the compare circuitry 861, 862 only if all of the comparators 891, 892 for a particular compare circuitry 861, 862 sense matches. These comparators 891, 892 can be used to compare the reference pattern and the input pattern in each row of the DRAM array 810. The multi-block DCAM 800 shown in FIG. 6 also includes a matching block component 869 that gathers the locations of each of the matching reference patterns and forwards those locations on the matching block component output 859.

Figure 7:
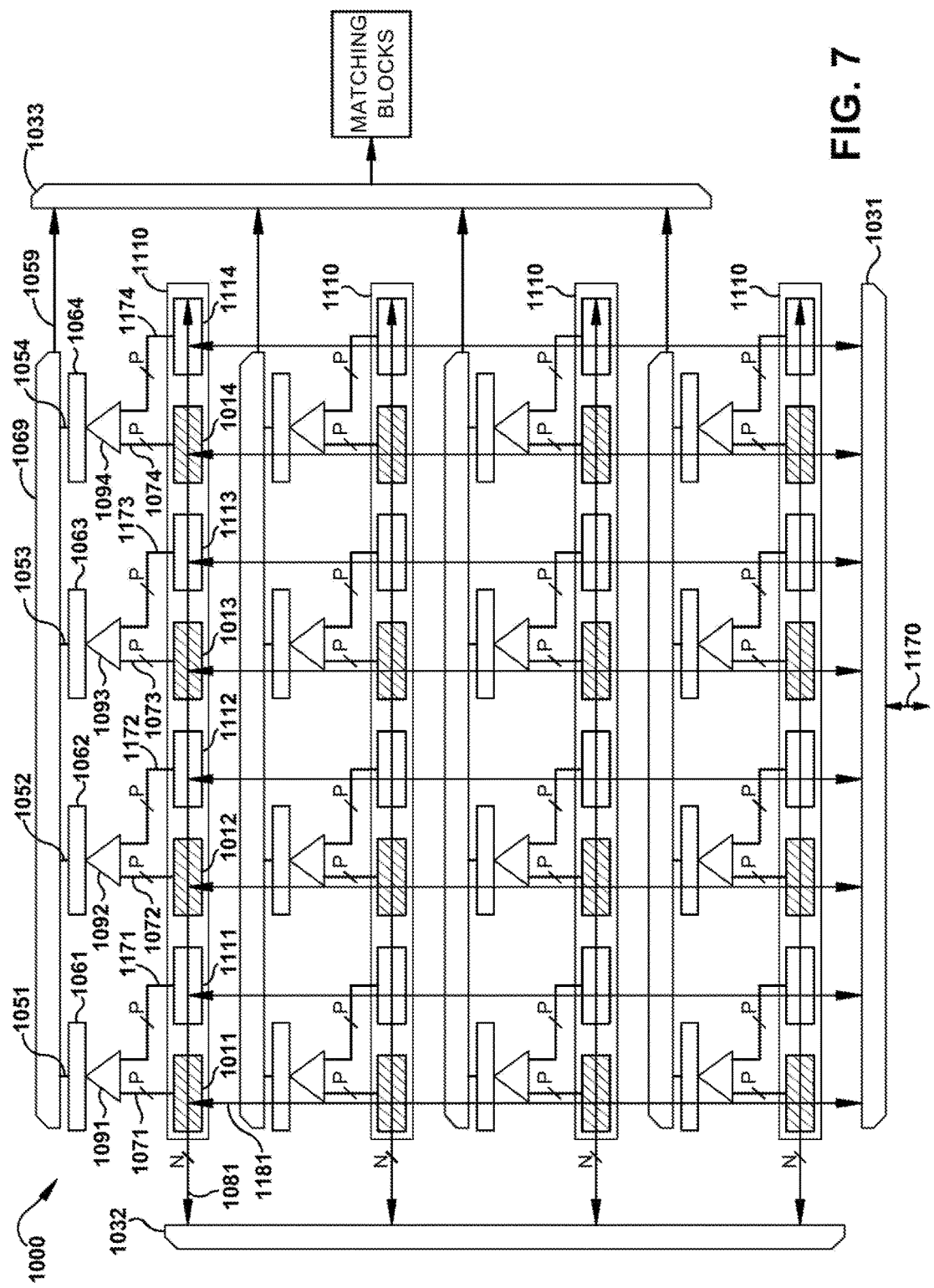
FIG. 7 is a diagram of an exemplary DCAM implemented with a DRAM array where sixteen stored data blocks (4×4) can be compared to an input pattern at the same time.

FIG. 7 is a diagram of an exemplary DCAM 1000 implemented with a DRAM array 1110 where sixteen stored data blocks (4×4) can be compared to an input pattern at the same time, increasing the speed of authentication. FIG. 7 shows a 4×4 bi-dimensional array with 16 stored data blocks and 16 input data blocks. In order to simplify the description, only four of the stored data blocks 1011, 1012, 1013, 1014 and the corresponding four input data blocks 1111, 1112, 1113, 1114 will be discussed in detail that would apply to the remaining blocks as well.

As shown in FIG. 7, the exemplary multi-block DCAM 1000 includes a DRAM array 1110 and compare circuitry 1061, 1062, 1063, 1064. The DRAM array 810 comprises a first stored data block 1011 for storing a first plurality of reference patterns (e.g., words or keys), a second stored data block 1012 for storing a second plurality of reference patterns, a third stored data block 1013 for storing a third plurality of reference patterns, and a fourth stored data block 1014 for storing a fourth plurality of reference patterns. For example, each of the stored data blocks 1011, 1012, 1013, 1014 can comprise N rows (e.g., 16) for storing N reference patterns, and each of the reference patterns can be P bits long (or wide). The DRAM array 1110 also comprises a first input data block 1111, a second input data block 1112, a third input data block 1113, and a fourth input data block 1114, all for receiving an input pattern (of the same size as the reference patterns) downloaded via the data lines 1170, column selector and I/O circuitry 1031, and the column select lines (e.g., first column select line 1181). For example, each of the input data blocks 1111, 1112, 1113, 1114 can comprise N rows (e.g., 16) for receiving the same input pattern that can be P bits long (or wide) and provided by P data lines 1170. Accordingly, the same input pattern is stored multiple times in the input data blocks 1111, 1112, 1113, 1114 for comparison with the reference patterns stored in the stored data blocks 1011, 1012, 1013, 1014. The reference patterns are stored in one half of the DRAM array 1110 (stored data blocks 1011, 1012, 1013, 1014) while the input pattern is received multiple times in the other half of the DRAM array 1110 (input data blocks 1111, 1112, 1113, 1114). While the exemplary DCAM 800 of FIG. 6 shows 16 stored data blocks and 16 input data blocks for illustrative purposes, it will be understood that a much larger array with more blocks can be employed. The number of blocks to be stored and compared in a DCAM can be very large because DRAM is a mature technology capable of storing large quantities of bits per die.

A pattern (or word) select line 1081 can be used to select a particular reference pattern in a row of the stored data blocks 1011, 1012, 1013, 1014 to be compared the input pattern during an authentication cycle. As discussed previously, when activated by the row decoder 1032, the pattern select line 1081 activate a transistor in each cell in a particular row. Once a row of P bits is activated in the stored data blocks 1011, 1012, 1013, 1014, the plurality of stored data bit lines 1071, 1072, 1073, 1074 can read the state of the DRAM cell as either in a discharged state ("0") or a charged state ("1"). Similarly, once a row of P bits is activated in the input data blocks 1111, 1112, 1113, 1114, the plurality of input data bit lines 1171, 1172, 1173, 1174 can read the state of the DRAM cell as either in a discharged state ("0") or a charged state ("1").

The matching operation works sequentially with one row of the stored data blocks 1011, 1012, 1013, 1014 compared to one row of the input data blocks 1171, 1172, 1173, 1174 during one authentication cycle at a time with the stored data bit lines 1071, 1072, 1073, 1074 and the input data bit lines 1171, 1172, 1173, 1174 activated concurrently so that multiple reference patterns (i.e., one from each of the stored data blocks 1011, 1012, 1013, 1014) can be compared to the input pattern in the input data blocks 911, 912 at once. In one embodiment, the compare circuitry 1061, 1062, 1063, 1064 of the DCAM 1000 can implement the BCAM truth table shown in FIG. 1A using an XOR gate (Exclusive OR) for each bit of the reference pattern. In one embodiment, the compare circuitry 1061, 1062, 1063, 1064 includes a first plurality of comparators 1091, a second plurality of comparators 1092, a third plurality of comparators 1093, and a fourth plurality of comparators 1094, one for each bit of the reference pattern to compare a bit of the input pattern on an input data bit line 1171, 1172, 1173, 1174 to the corresponding bit of the stored reference pattern on a stored data bit line 1071, 1072, 1073, 1074. The compare circuitry 1061, 1062, 1063, 1064 also includes a matching logic block that outputs a "yes" on the compare circuitry outputs 1051, 1052, 1053, 1054 of the compare circuitry 1061, 1062, 1063, 1064 only if all of the comparators 1091, 1092, 1093, 1094 for a particular compare circuitry 1061, 1062, 1063, 1064 sense matches. These comparators 1091, 1092, 1093, 1094 can be used to compare the reference pattern and the input pattern in each row of the DRAM array 1110. The multi-block DCAM 1000 shown in FIG. 7 also includes a matching block component 1069 that gathers the locations of each of the matching reference patterns and forwards those locations on the matching block component output 1059 to the matching block 1033.

As shown in FIG. 7, the exemplary DCAM 1000 implemented with a DRAM array 1110 along with circuitry for performing the matching operations, where the DRAM array 1110 and the matching circuitry is located on the same die. The circuitry for performing the matching operations includes compare circuitry 1061, 1062, 1063, 1064, comparators 1091, 1092, 1093, 1094, matching block 1033, and a matching block component 1069. Since the circuitry for performing the matching operations occupies a large portion of the die, the packing density (or array efficiency) of the CAM, is reduced. Three-dimensional (3D) packaging where multiple die are stacked together can improve system performance and reduce power consumption. In these designs, the vertical connections at the cell level reduce the resistivity between the CAM cell and the circuitry located in a different die.

Figure 8:
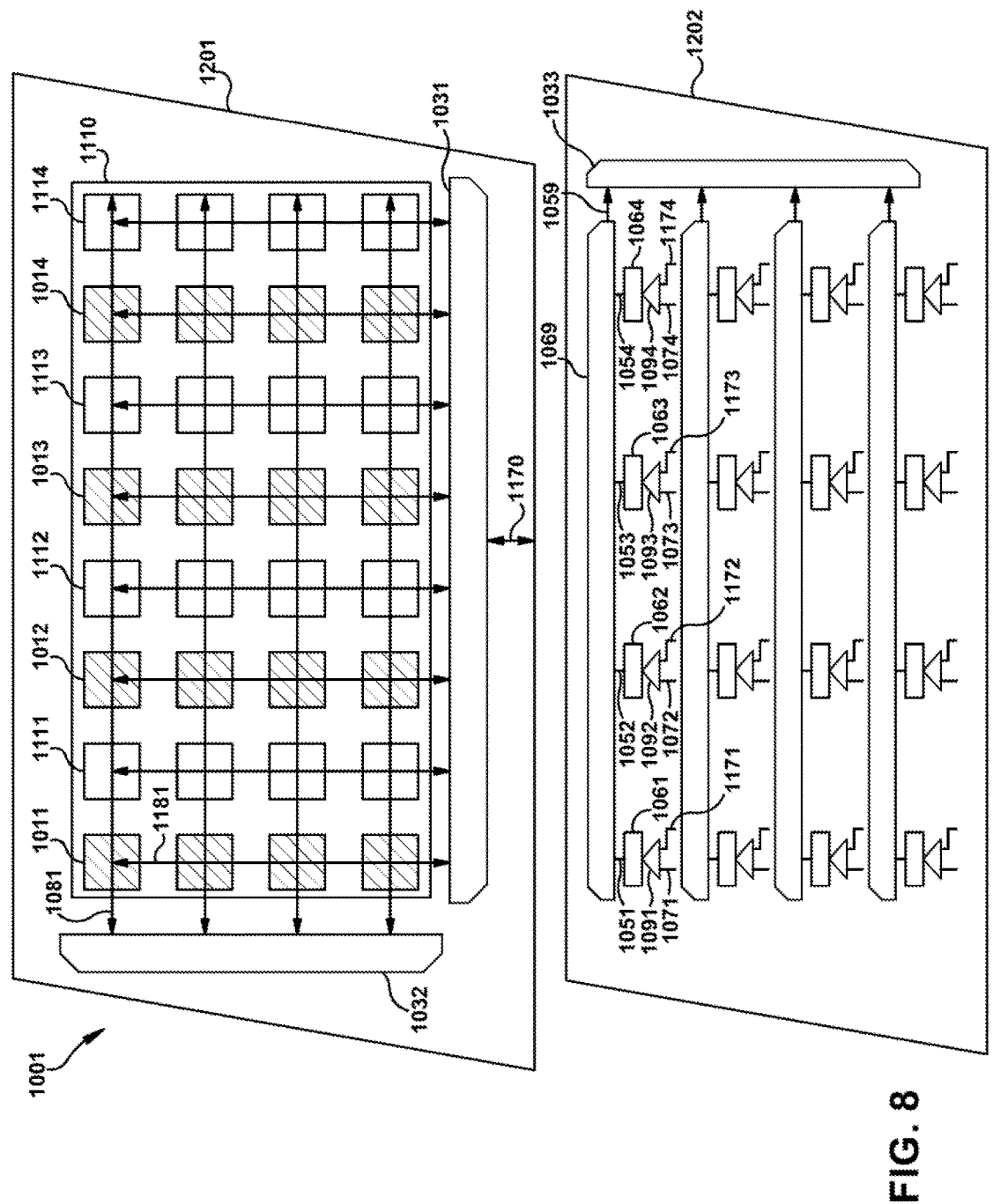
FIG. 8 is a diagram of an exemplary DCAM implemented with a DRAM array where sixteen stored data blocks (4×4) can be compared to an input pattern at the same time, where the DRAM array is located on a first die and the circuitry for performing the matching operations is located on a second die.

FIG. 8 is a diagram of an exemplary DCAM 1001 implemented with a DRAM array 1110 where sixteen stored data blocks (4×4) can be compared to an input pattern at the same time, where the DRAM array 1110 is located on a first die 1201 and the circuitry for performing the matching operations is located on a second die 1202. 3D packaging as shown FIG. 8 can greatly improve array efficiency. The circuitry controlling the matching engine is transferred into a separate die 1202 that is assembled with the memory die 1201 in a three dimensional package, and connected through a large number of vertical connections spread across the dies. In existing designs, the 3D vertical connections are part of each of the CAM cells, which is complicated to produce since the vertical connections are located on memory arrays that can include thousands of individual cells. This disclosed embodiment reduces the number of vertical connections, and simplifies the manufacturing operations. For example, as shown in FIG. 8, 4×4 blocks of stored reference patterns are compared with 4×4 blocks of input patterns. Since a single comparator services a bit for all of the different rows of a block, this reduces the number of vertical connections required. Such a method that needs only a small number of vertical connections per device can be produced with mature 3D packaging technologies. An alternative method is to place vertical connections at the end of each bit line. The advantage of this second method, compared with existing designs, is that there is only one vertical connection per column of cells. The second method requires more vertical connections than the first method. Both methods can increase array efficiency, improve performance, and reduce power losses. The logic companion die 1202 also has empty portions that can be utilized to insert additional logic blocks.

Figure 9:
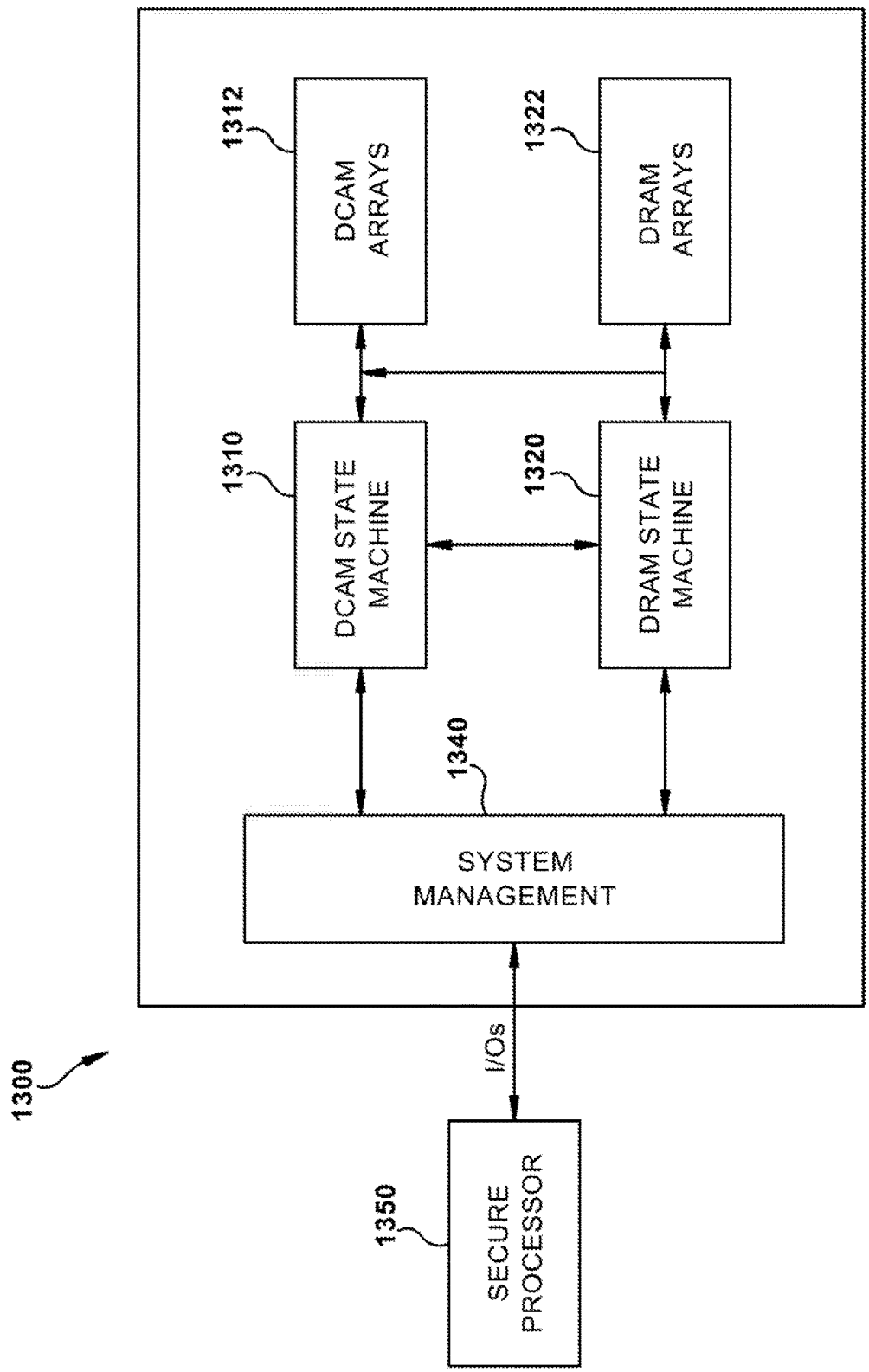
FIG. 9 is a block diagram of an exemplary state machine for operating the disclosed DCAMs.

FIG. 9 is a block diagram of an exemplary state machine 1300 for operating the disclosed DCAMs. Considering that DCAMs are based on DRAM technology, the state machine 1300 can manage part of the array as a regular DRAM, while reserving a portion of the array for DCAM usage. This allows the reuse of existing DRAM solutions. The exemplary state machine 1300 has the combined instruction set of a DRAM and a DCAM. The DCAM State Machine 1310 drives a traditional DRAM State Machine 1320 to perform bit level management tasks, program the storage area, verify and correct the content as needed, and refresh the stored data. The DCAM State Machine 1310 also loads stored blocks in the DCAM arrays 1312, refreshes data in the DCAM arrays 1312, and loads the input blocks in the DCAM arrays 1312. The DCAM State Machine 1310 can also condition the DCAM arrays 1312 before storing the input pattern. The DCAM State Machine 1310 also extracts matching patterns and their addresses from the DCAM arrays 1312. The DRAM State Machine 1320 programs bits in the DCAM array s 1312 and the DRAM arrays 1322, performs Built-In-Self-Test and verification, and error corrections, and reads the DRAM array 1322. The state machines 1310, 1320 communicate with a system management module 1340 that communicates with a secure processor 1350. In one embodiment, the state machines are configured using arithmetic logic units (ALUs) or similar structures.

The need to put a DCAM on hold during refresh cycles could slow down the data rate when the downloading of input patterns has to occur concurrently. The method to improve the data rate is to perform the refresh cycles at a higher frequency. This way, if data has to be downloaded concurrently with the scheduled refresh cycle, this refresh cycle can be put on hold waiting for the downloading to be completed without losing the already stored information, or to refresh a portion of the DCAM in advance, and to make it ready to download and compare. This method could have limitations when long continuous stream of input patterns are downloaded and processed. In this case, the data rate lost due to the refresh should be relatively small because the duty cycle refresh time/active time is relatively small while the data stream is temporarily buffered.

Figure 10A:
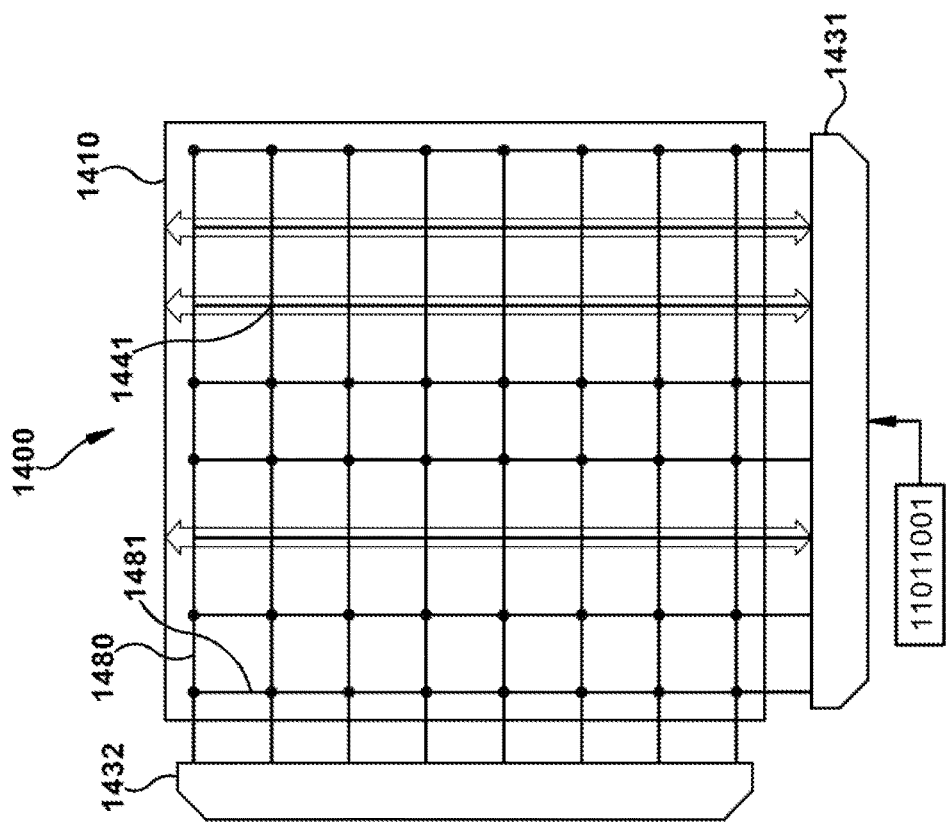
FIGS. 10A and 10B illustrate examples of efficiently downloading an input pattern to a DCAM.
Figure 10B:
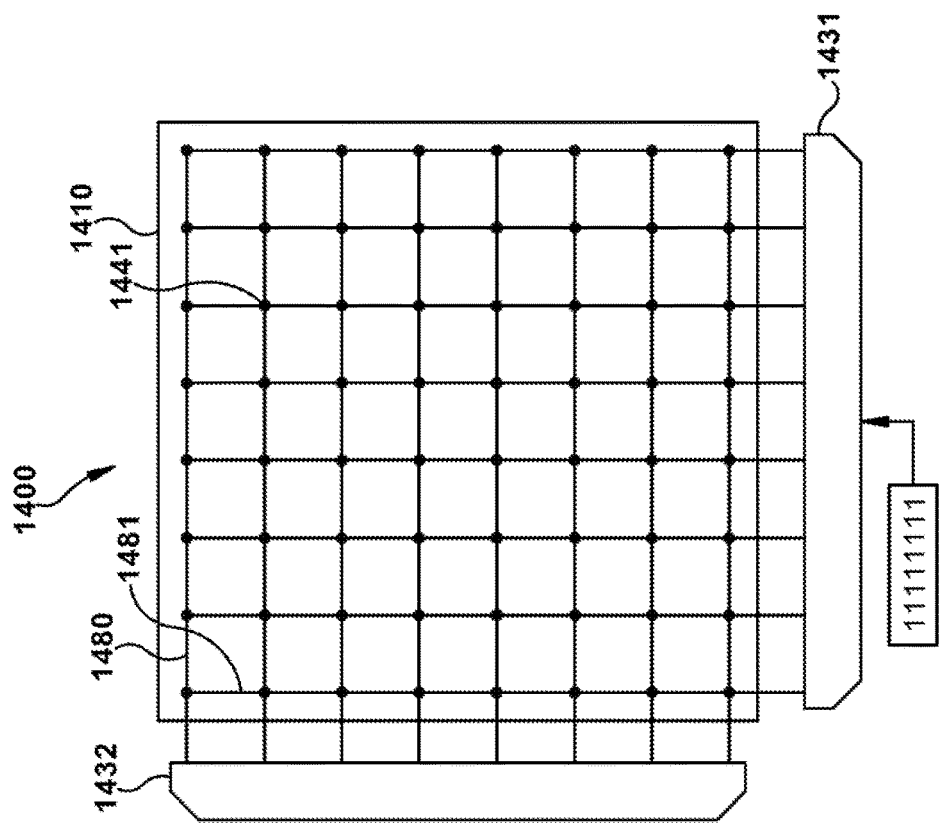

In CAMS/TCAMs, blocks of reference patterns need to be downloaded in the memory array on a regular basis. The data integrity needs to be carefully validated and corrected after download. At the cell level, the physics is based on charging electrons or not, as it is in a DRAM. This includes bit programming, Built In Self-Test (BIST), bit correction, and refresh. For some applications, continuous streams of input blocks need to be processed by the CAM/TCAM in Gigabits per second. In other applications, it is important to download the input pattern extremely quickly, while there is no continuous stream of input blocks to process. The DRAM architectures that consume multiple clock cycles to download random data in the arrays can be improved. One method to improve the data rate is to program all rows at once. This can be done because the same input patterns can be stored together in multiple rows. The second method is to increase the number of bit lines that can be programmed at once. With DRAM, less than 1,000 bit lines are programmed together. This can be increased for a DCAM because the parts can afford to drain more current. The third method is exemplified in FIGS. 10A and 10B, which illustrate examples of efficiently downloading an input pattern to a DCAM. The exemplary DCAM 1400 shown in FIGS. 10A and 10B is an 8×8 DRAM array 1410, with 8 rows of 8 bits requiring an 8-bit input pattern. The DCAM 1400 also includes column selector and I/O circuitry 1431, a row decoder 1432, pattern select lines 1480, and column select lines 1481. As shown in FIGS. 10A and 10B, each of the intersections represent a DRAM cell 1441.

In one exemplary loading process, the state machine preloads "1"s in advance into each of the input data bit lines in each of the columns in the DRAM array as shown in FIG. 10A. Any zeros ("0") in the input pattern are downloaded by locally shunting the bit lines, while the "1"s remain in place as shown in FIG. 10B. This can be done in only one clock cycle. These methods are optimum when the DCAMs are small enough to be programmed at once, or when the DCAM can be preloaded with "1"s in advance. In the case of a very large DCAM, portions of the arrays can be pre-programmed, while other portions are concurrently busy doing matching functions. The exemplary DCAMs described herein can function with, or without, the described loading methods.

The DCAMs disclosed herein can be used in non-security CAM/TCAM applications as well as security/authentication applications. Electronic systems with user authentication based on a secure element can take advantage of a DCAM to enhance security. Such systems include, but are not limited to, portable terminal devices, smart phones, PDA, laptop computers, desktop computers, workstations, and consumer devices. Dozens of secure patterns are involved to strengthen security, such as but are not limited to, passwords, multiple Public keys and Private keys, biometric signatures (finger print, face, voice, eye and iris, heart beating signals, DNA), Physical Unclornable Function (PUF), Pin codes, and Random computer generated codes. These secure patterns are stored in advance in the secure element, while the users provide matching information during the authentication cycles.

Figure 11:
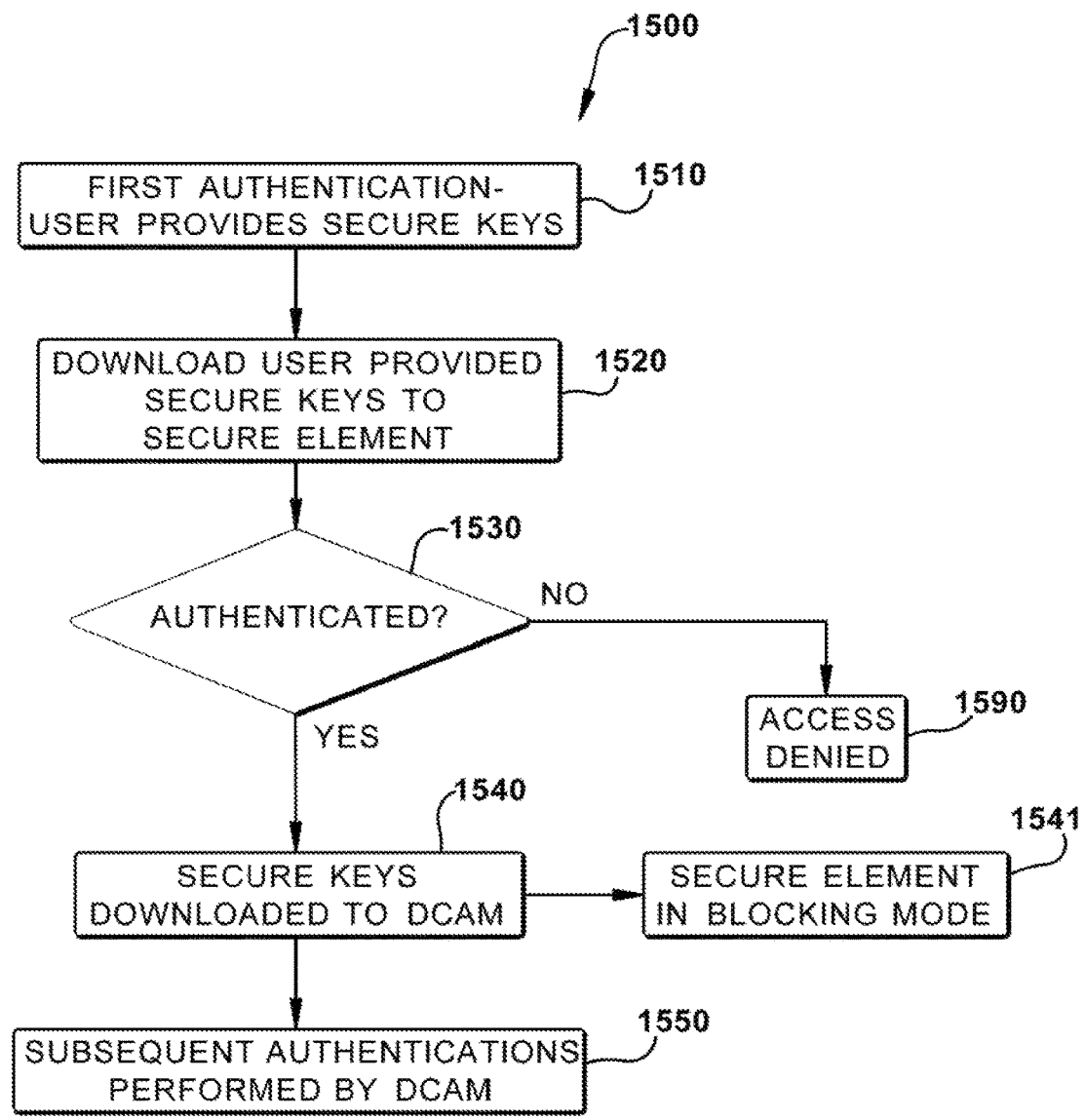
FIG. 11 is a flow diagram of an exemplary method to strengthen security with a DCAM.

FIG. 11 is a flow diagram of an exemplary method 1500 to strengthen security with a DCAM. As it is currently done with an embedded secure element, the first step 1510 of the method starts with an authentication just after the system is powered up. During this first (or initial) authentication, the user enters one or multiple identification keys or patterns that are matched with the ones stored in the secure element. At step 1520, the user-provided keys are downloaded to the secure element, which uses non-volatile memory to store the secure keys to be compared to the user-provided keys. If the first authentication is not satisfactory, the secure element denies access at step 1590. If the authentication is satisfactory, at step 1540, the secure element downloads the user-provided keys to the DCAM. The secure element then switches to a blocking mode that does not accept further authentication cycles.

As long as the system stays powered up, at step 1550, subsequent authentications will be done with the DCAM, not the secure element. As previously described, the matching process done with a DCAM can be done very quickly, as fast as two machine clock cycles. This is orders of magnitude faster than what a secure element can do. In addition, a small DCAM can drain much lower currents than a Flash based secure element during the authentication process, reducing power consumption. Side channel attacks, such as DPA and EMI, during subsequent authentications will be more difficult to perform.

These subsequent authentication cycles are more secure due the quickness of the matching operation in a DCAM. In addition, the lower currents drained during authentication make side channel attacks more difficult. In this method, the keys and pattern stored in the secure element are never exposed. The keys and patterns that are downloaded to the DCAM are the ones that the user entered during the first step authentication cycle. If hackers fail to break the system during the first step, subsequent opportunities will be based on breaking the DCAM, not the secure element that is basically on hold.

The use of DCAM for security applications has several advantages. For example, DCAMs are faster than Flash-based Secure Elements and can use enhanced cryptographic methods. In case of an attack, DCAMs can detect the problem faster, and block the entire system. DCAMs can store very large arrays of DRAM cells that can be used to hide the secret keys or patterns. DTCAMs can leverage the Ternary state to add complicated encryption techniques. A traditional DRAM die alone can be used instead of a DCAM for subsequent authentications.

The use of DRAMs for designing two-state CAMs (DB-CAMs) and three-state CAMs (DTCAMs) has several advantages. First, since DRAMs are less expensive than SRAMs and Flash typically used in CAMs/TCAMs, the DCAMs are less expensive to manufacture. Second, since the DCAMs are manufactured using existing DRAM arrays and existing DRAM manufacturing techniques, using half of the arrays for storage of reference patterns and the other half for receiving the input pattern. Third, since DRAMs typically drain less power than SRAMs and the DCAMs use a lower number of transistors per cell than CAMs/TCAMs manufactured with SRAMs, DCAMs use less power than traditional CAMs/TCAMs. The lower power consumption and smaller size of DCAMs compared with conventional CAMs/TCAMs allows the packaging of a much larger number of cells per device, increasing the bit capacity of DCAMs compared with conventional CAMs/TCAMs. Three-dimensional (3D) packaging of DCAMs can reduce the length of the connections between subcomponents, improve performance, further improve power efficiency, and further increase the capacity. Furthermore, since DRAM cells operate at very low power, side channel attacks such as Differential Power Analysis (DPA) and electromagnetic interference (EMI) detection are much more difficult.

In a CAM/TCAM, the downloading of stored reference patterns can be done in such a way that the integrity and the quality of the data are carefully managed. However, noise can disturb the download of the input patterns due to the need to respond quickly to fast streams of data. Errors can be made either by storing the wrong bits in the input arrays, or due to erroneous compare cycles. The architecture of the exemplary DCAMs offer remedies that can lower such error rates. DCAMs can also offer redundancy, or the use of additional rows that confirm a particular match. In order to determine a match the exclusive OR logic follows the following rule:

{XOR (a, a')}=yes; if (a=a'); {XOR (a, a')}=no; if (a≠a')

In the exemplary DCAM, it is possible to change this rule using the absolute value of the differences as shown below:

{XOR (a, a')}=yes; if (abs(a-a')<E); {XOR (a, a')}=no; if (abs(a-a')>D); {XOR (a, a')}=fuzzy; if (D>abs(a-a')>E)

E and D are adjustable thresholds that determine the difference between clear definitive states (match or mismatch), and fuzzy matching. Patterns that create a fuzzy matching can then be flagged and corrected.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of performing authentication with a memory circuit, the method comprising:
    performing a first authentication with a non-volatile secure element, comparing a first user-provided cryptographic key with a cryptographic key stored in the non-volatile secure element;
    if the first authentication is successful, downloading the first user-provided cryptographic key to a dynamic random access memory (DRAM) array configured as a content addressable memory (CAM) and switching the non-volatile secure element to a blocking mode that does not accept further authentication cycles after the step of downloading the first user-provided cryptographic key to the DRAM array configured as the CAM if the first authentication is successful; and
    performing a second authentication with the DRAM array configured as the CAM, comparing a second user-provided cryptographic key with the first user-provided cryptographic key stored in the DRAM array configured as the CAM.

2. The method of claim 1, further comprising performing a third authentication with the DRAM array configured as the CAM, comparing a third user-provided cryptographic key with the first user-provided cryptographic key stored in the DRAM array configured as the CAM.

3. The method of claim 1, wherein the CAM comprises a first block of a plurality of DRAM cells configured for storing the first user-provided cryptographic key and a second block of a plurality of DRAM cells configured for receiving the second user-provided cryptographic key.

4. A method of performing authentication with a memory circuit, the method comprising:
    downloading a first user-provided cryptographic key to a non-volatile secure element;
    performing a first authentication with the non-volatile secure element, comparing the first user-provided cryptographic key with a cryptographic key stored in the non-volatile secure element;
    if the first authentication is successful, downloading the first user-provided cryptographic key to a dynamic random access memory (DRAM) array configured as a content addressable memory (CAM);
    if the first authentication is successful, switching the non-volatile secure element to a blocking mode that does not accept further authentication cycles; and
    performing a second authentication with the DRAM array configured as the CAM, comparing a second user-provided cryptographic key with the first user-provided cryptographic key stored in the DRAM array configured as the CAM.

5. The method of claim 4, wherein the CAM comprises a first block of a plurality of DRAM cells configured for storing the first user-provided cryptographic key and a second block of a plurality of DRAM cells configured for receiving the second user-provided cryptographic key.

6. A method of performing authentication with a memory circuit, the method comprising:
performing a first authentication with a non-volatile secure element, comparing a first user-provided cryptographic key with a cryptographic key stored in the non-volatile secure element;
if the first authentication is successful, downloading the first user-provided cryptographic key to a memory array configured as a content addressable memory (CAM) and switching the non-volatile secure element to a blocking mode that does not accept further authentication cycles after the step of downloading the first user-provided cryptographic key the memory array configured as the CAM if the first authentication is successful; and
performing a second authentication with the memory array configured as the CAM, comparing a second user-provided cryptographic key with the first user-provided cryptographic key stored in the memory array configured as the CAM.

7. The method of claim 6, further comprising performing a third authentication with the memory array configured as the CAM, comparing a third user-provided cryptographic key with the first user-provided cryptographic key stored in the memory array configured as the CAM.

8. A method of performing authentication with a memory circuit, the method comprising:
downloading a first user-provided cryptographic key to a non-volatile secure element;
performing a first authentication with the non-volatile secure element, comparing the first user-provided cryptographic key with a cryptographic key stored in the non-volatile secure element;
if the first authentication is successful, downloading the first user-provided cryptographic key to a memory array configured as a content addressable memory (CAM);
if the first authentication is successful, switching the non-volatile secure element to a blocking mode that does not accept further authentication cycles; and
performing a second authentication with the memory array configured as the CAM, comparing a second user-provided cryptographic key with the first user-provided cryptographic key stored in the memory array configured as the CAM.

9. A method of performing authentication with a memory circuit, the method comprising:
performing a first authentication with a non-volatile secure element, comparing a first user-provided cryptographic key with a cryptographic key stored in the non-volatile secure element;
if the first authentication is successful, downloading the first user-provided cryptographic key from the non-volatile secure element into a memory array configured as a content addressable memory (CAM);
switching the non-volatile secure element to a blocking mode that does not accept further authentication cycles after the user-provided cryptographic key is downloaded into the memory array configured as the CAM; and
performing a second authentication with the memory array configured as the CAM by comparing a second user-provided cryptographic key with the first user-provided cryptographic key stored in the memory array configured as the CAM.

10. The method of claim 9, wherein the CAM comprises a first block of a plurality of DRAM cells configured for storing the first user-provided cryptographic key and a second block of a plurality of DRAM cells configured for receiving the second user-provided cryptographic key.

* * * * *